United States Patent [19]
Klein

[11] Patent Number: 5,392,310
[45] Date of Patent: Feb. 21, 1995

[54] LASER APPARATUS

[75] Inventor: Jürgen Klein, Aachen, Germany

[73] Assignee: Fraunhofer-Gesellschaft zur Förderung der Angewanten Forschung e.V., München, Germany

[21] Appl. No.: 124,665

[22] Filed: Sep. 21, 1993

Related U.S. Application Data

[63] Continuation of Ser. No. 842,486, Feb. 27, 1992, abandoned.

[51] Int. Cl.[6] .............................................. H01S 3/08
[52] U.S. Cl. ....................................... 372/95; 372/92; 372/103
[58] Field of Search ...................... 372/92, 93, 95, 103

[56]  References Cited

U.S. PATENT DOCUMENTS

| | | | |
|---|---|---|---|
| 3,365,671 | 1/1968 | Kogelnik | 359/346 |
| 3,436,665 | 4/1969 | Rigrod | 359/346 |
| 3,437,954 | 4/1969 | Herriott et al. | 359/346 |
| 3,808,552 | 4/1974 | Baues | 372/97 |
| 3,904,983 | 9/1975 | Moreno et al. | 372/93 |
| 3,992,682 | 11/1976 | White et al. | 359/346 |
| 4,001,705 | 1/1977 | Sinclair et al. | 372/94 |
| 4,235,518 | 11/1980 | Greiner | 372/103 |
| 4,433,418 | 2/1984 | Smith | 372/95 |
| 4,446,556 | 5/1984 | Koepf | 372/93 |
| 4,468,776 | 8/1984 | McLellan | 372/103 |
| 4,703,491 | 10/1987 | Lim | 372/93 |
| 4,723,256 | 2/1988 | Hoag | 372/93 |
| 4,872,179 | 10/1989 | Niische et al. | 372/93 |
| 4,930,138 | 5/1990 | Opower | 372/92 |
| 4,939,738 | 7/1990 | Opower | 372/93 |
| 5,014,282 | 5/1991 | Herzinger et al. | 372/93 |
| 5,021,742 | 6/1991 | Jacob | 372/93 |

Primary Examiner—Léon Scott, Jr.
Attorney, Agent, or Firm—Albert H. Reuther

[57] ABSTRACT

A laser apparatus with a laser oscillator and a subsequently connected laser intensifier which has an inlet region for the laser beam to be intensified coming from the laser oscillator and an outlet for the intensified laser beam and which is provided with a folding mirror that lies opposite to the inlet region for the laser beam to be intensified. The inlet region for the laser beam to be intensified is an opening in a further folding mirror which is located opposite to the other folding mirror. The outlet for the intensified laser beam likewise is an opening in one of the two folding mirrors. The opening width of the inlet opening and the outlet opening in relation to the mirror surface of the particular folding mirror is small. The cross section of the laser beam inside the laser intensifier is at least partially greater by a multiple than in the region of the inlet opening and outlet opening. In a region externally of the laser intensifier before respectively after the respective opening there is arranged a partially permeable respectively reflecting mirror so that the laser intensifier operates as a laser oscillator. The laser oscillator is integrated in the laser intensifier.

25 Claims, 8 Drawing Sheets

LASER APPARATUS

This is a continuation of parent patent application U.S. Ser. No. 842,486-Klein, filed Feb. 27, 1992, now abandoned. This application is abandoned as of the date of the filing of the present continuation application upon termination of proceedings in the parent case.

BACKGROUND OF THE INVENTION

1. Field of the Invention

The present invention relates to a laser apparatus or arrangement having a laser oscillator and a subsequently connected laser amplifier, which has an entry region for the laser beam to be amplified as coming from the laser oscillator and an outlet for the amplified or reinforced laser beam and which is provided with a folding mirror which is located lying opposite the entry region for the laser beam to be intensified or strengthened and bolstered.

2. Description of the Prior Art

The most common or customary manner for production and generation of laser beams of a prescribed output capacity is the employment of a laser oscillator. The combination of a laser oscillator of small or nominal capacity and a laser intensifier or amplifier is employed especially then when a laser beam of high output capacity and simultaneously good beam quality and/or high modulation band width is required. Disadvantages of conventional or previous laser intensifiers or amplifiers, so-called single-pass intensifiers or amplifiers are among others the poor or bad utilization of the intensifying medium via the still weak oscillator beam in the input region of the intensifier or amplifier, the large construction length necessary with weak intensifying media and the increased constructive cost and complexity for separate oscillators and intensifiers or amplifiers in comparison to power-capacity or performance laser oscillators.

In order to reduce or decrease some of these disadvantages of the intensifier or amplifier, the laser beam with a different known intensifier or amplifier, a so-called multi-pass intensifier or amplifier can pass multiply through the intensifying medium. Here in place of the window to the rear in the incidence direction of the oscillator beam, as provided with a single-pass-intensifier or amplifier there is provided a folding mirror or reflecting means is provided at which the laser beam is reflected. The construction length required for attaining a prescribed intensification or amplification is reduced and the regions occurring or arising in the input or entry region of single-pass intensifiers or amplifiers with hardly utilized intensifying medium are made smaller or reduced. Disadvantageous with a multi-pass intensifier or amplifier, however, is that a space separation of beams running or extending back and forth proceeding in a small angle as to each other can occur first in a large spacing from the intensifying or amplification tube, whereby a compact construction of the system is made more difficult.

SUMMARY OF THE INVENTION

An object of the present invention basically is to embody and construct the generic laser apparatus or arrangement so that the intensifying or amplifying medium in the laser intensifier or amplifier can be utilized optimally with compact construction of the laser apparatus or arrangement.

This object is fulfilled with the generic laser apparatus or arrangement having characterizing features set forth in greater detail such that the entry or input region for the laser beam to be intensified or amplified is an opening in a further folding mirror or reflecting means which is located opposite to the other folding mirror or reflecting means, that the discharge or outlet for the intensified or reinforced laser beam likewise is an opening in one of the two folding mirrors or reflecting means, that the opening width or the entry or inlet opening and the discharge or outlet opening is small in relation to the mirror or reflecting surface of the respective folding mirror or reflecting means, and that the cross section of the laser beam within the laser intensifier or amplifier is at least partially greater by a multiple than in the region of the input or entry opening and discharge or outlet opening.

With the present inventive laser apparatus or arrangement the laser intensifier or amplifier has two end-side folding mirrors or reflecting means as well as an inlet or entry opening for the laser beam to be intensified or amplified and an outlet or discharge opening for the intensified or amplified laser beam.

The laser beam to be intensified or amplified coming from the laser oscillator enters or passes through the entry or inlet opening into the laser intensifier or amplifier and leaves or departs therefrom after a corresponding number or through-passes through the laser medium in the laser intensifier and departing through the discharge or outlet opening. The beam diameter of the laser beam to be intensified or amplified rises or increases rapidly after through-passage via the entry or inlet opening, changing or varying itself hardly then during the through-passes through the laser medium and then rapidly decreasing again shortly before the discharge or outlet thereof. An optimum utilization of the laser medium results thereby with compact embodiment and construction of the laser intensifier or amplifier.

Further objects and advantages as well as further features of the present invention become apparent from the following description, reference being made to the accompanying drawings which show the following:

Figure 7:
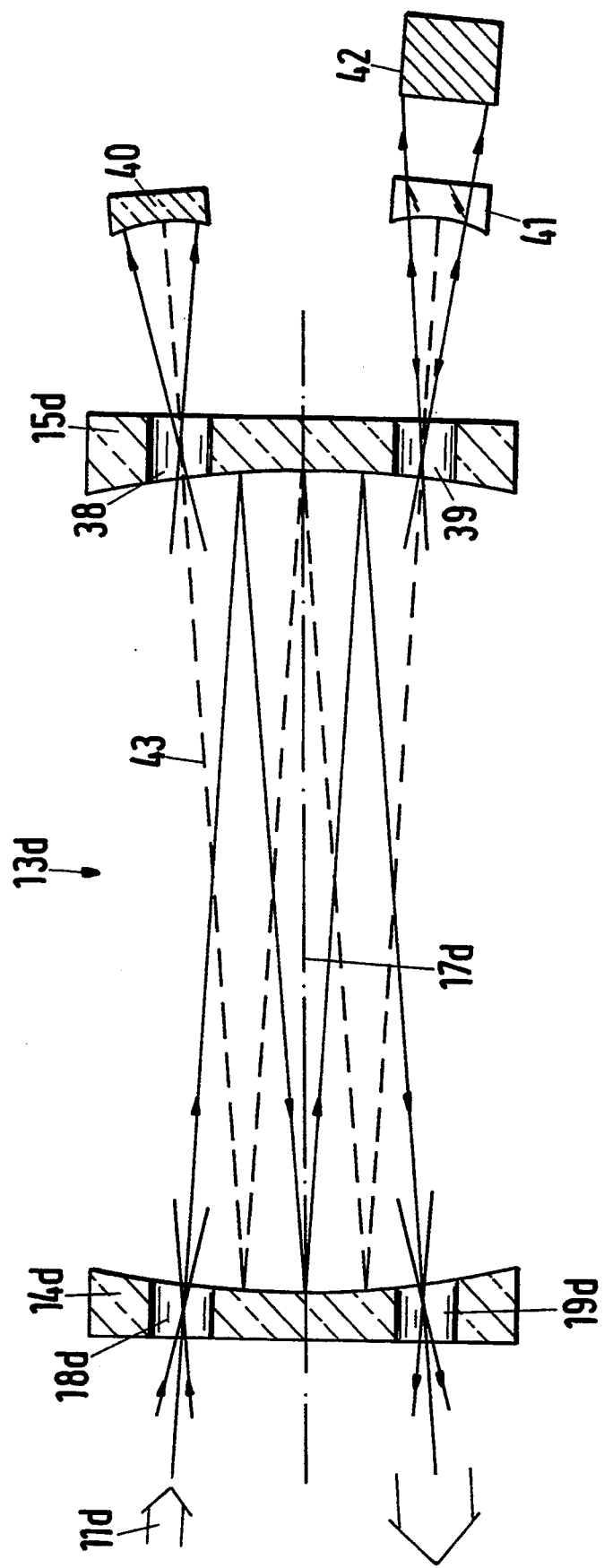
Figure 8:
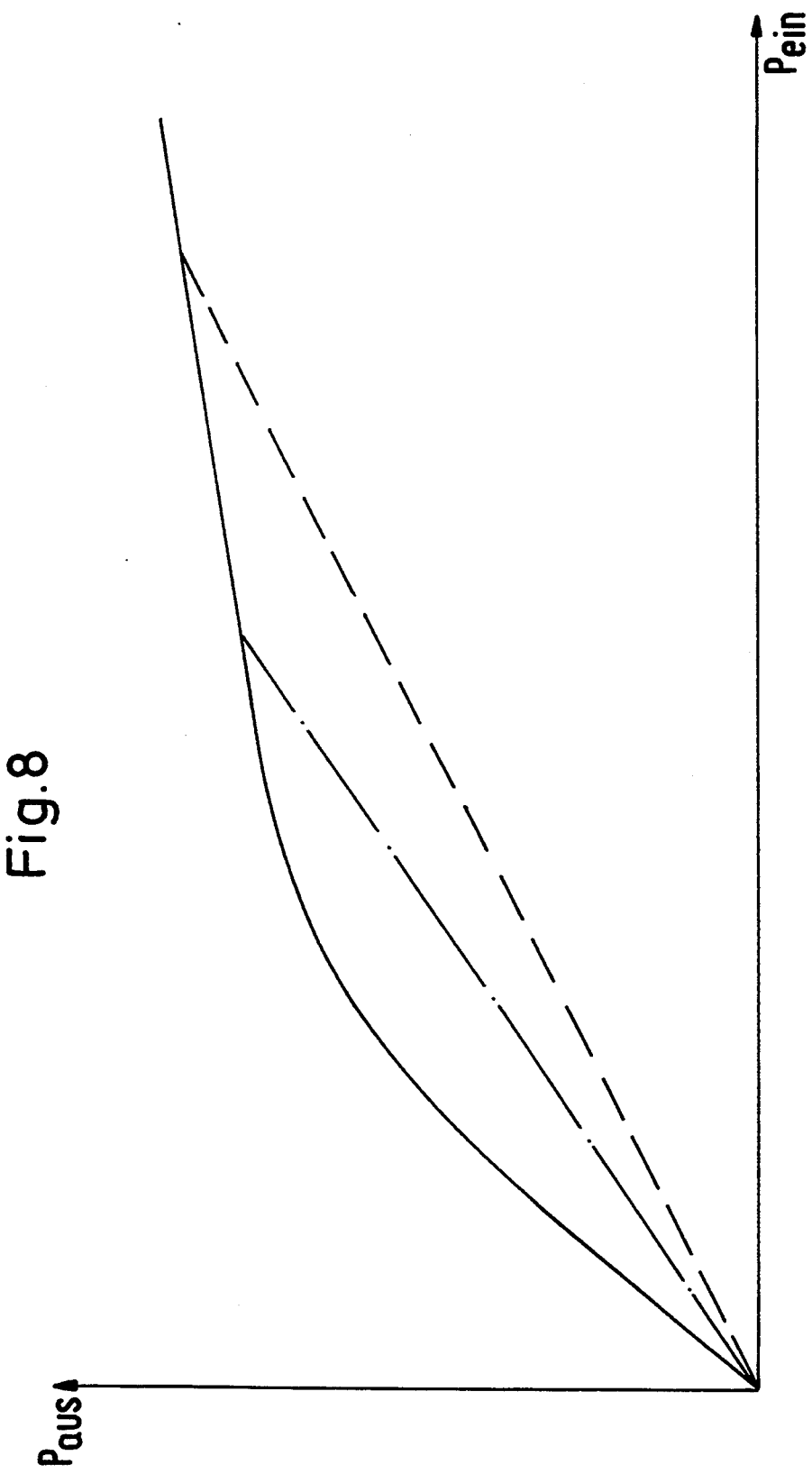

FIG. 7 is a view that shows in a schematic representation a laser intensifier or amplifier with an auxiliary, aiding or assisting resonator of a fifth embodiment of a laser apparatus or arrangement with features in accordance with the present invention; and FIG. 8 is a view that shows a graphical illustration of a transmission or transfer characterizing line or curve of the laser intensifier or amplifier according to FIG. 7.

DETAILED DESCRIPTION OF PREFERRED EMBODIMENTS

Figure 1:
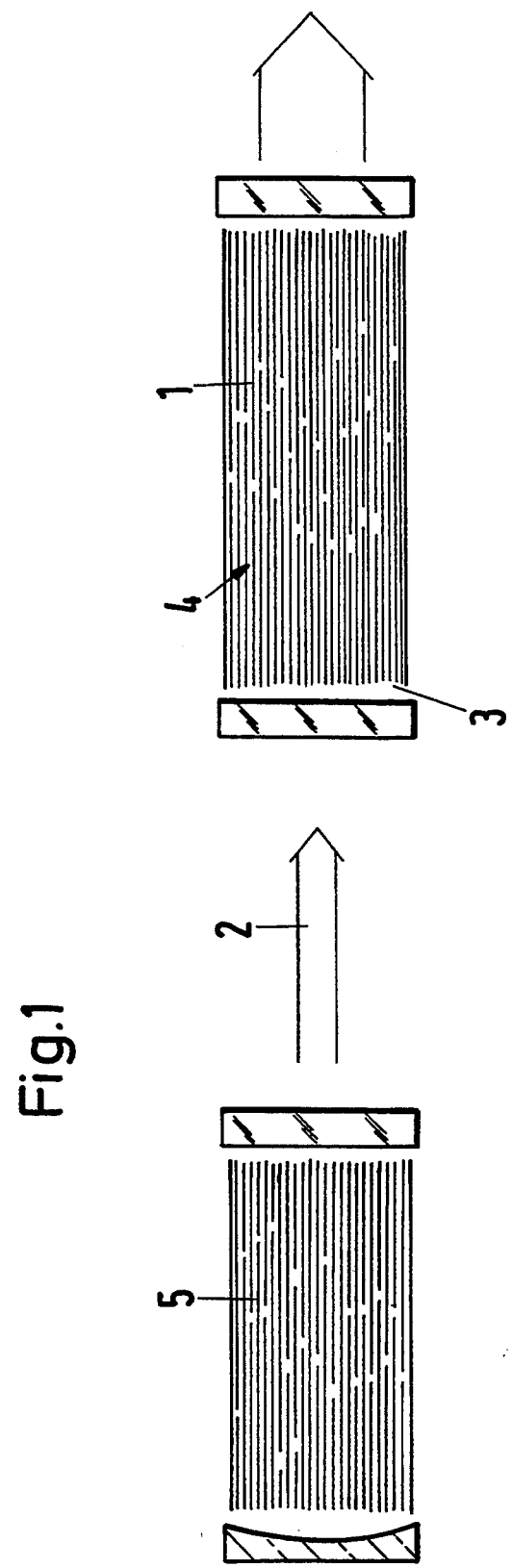
FIG. 1 shows a schematic representation of a conventional laser intensifier or amplifier, a so-called single-pass intensifier or amplifier.

As illustrated in FIG. 1 showing conventional laser intensifiers or amplifiers, so-called single-pass intensifiers or amplifiers, disadvantages among others are the bad or poor utilization of the intensifying or reinforcing medium 1 through the still weak oscillator beam 2 in the entry or inlet region 3 of the intensifier or amplifier 4, the large construction length required with weak intensifying media and the increased or elevated construction cost and complexity for separate oscillators 5 and intensifiers or amplifiers 4 in comparison to power-capacity performance laser oscillators.

Figure 2:
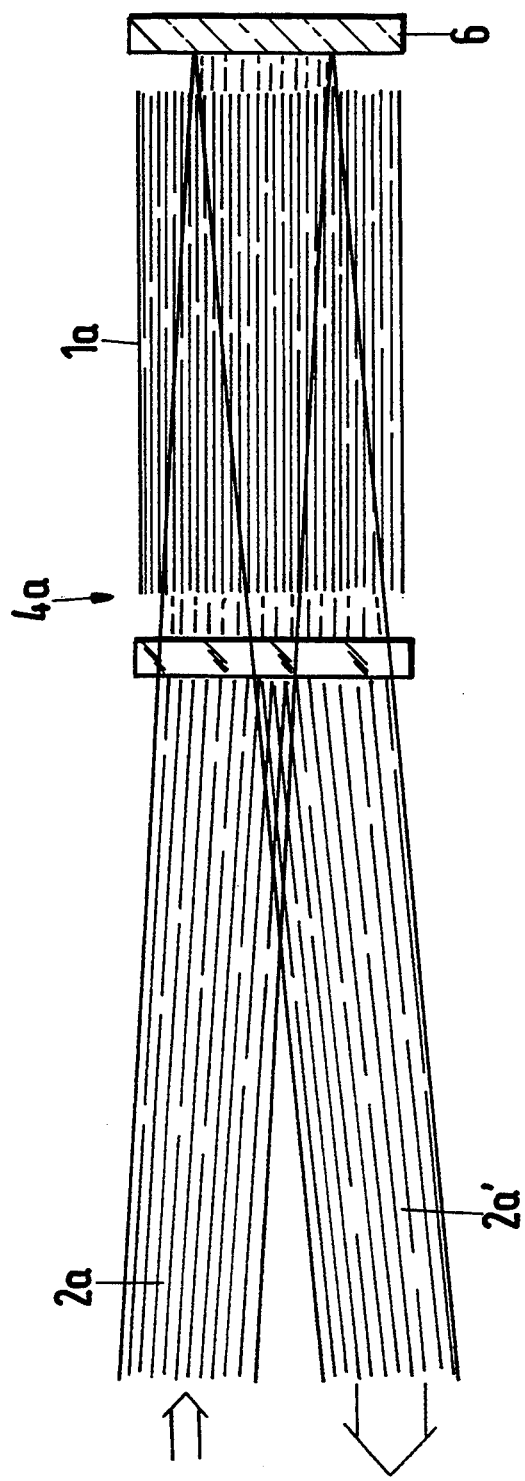
FIG. 2 shows a schematic representation of a further known intensifier or amplifier, a so-called multi-pass intensifier or amplifier.

In order to reduce some or certain of these disadvantages of the intensifier or amplifier, the laser beam 2a can pass multiply through the intensifying medium 1a with a different known intensifier or amplifier, a so-called multi-pass intensifier or amplifier as schematically illustrated in the view of FIG. 2. Here, in place of the rear window in incidence direction of the oscillator beam 2a, as provided with the single-pass intensifier or amplifier according to FIG. 1, a folding mirror or reflecting means 6 is provided at which the laser beam 2a is reflected. The construction length required for attaining a prescribed intensification or amplification reduces itself and the regions arising or occurring in the input or inlet range of single-pass intensifiers or amplifiers with hardly utilized reinforcing or intensifying medium are reduced or made smaller. Disadvantageous with the multi-pass intensifier or amplifier, however, is that a spatial separation of the beams 2a, 2a' running back and forth extending in a small angle as to each other can occur first in a large spacing from the intensification or amplification tube, whereby a compact construction of the system is made more difficult.

Figure 3:
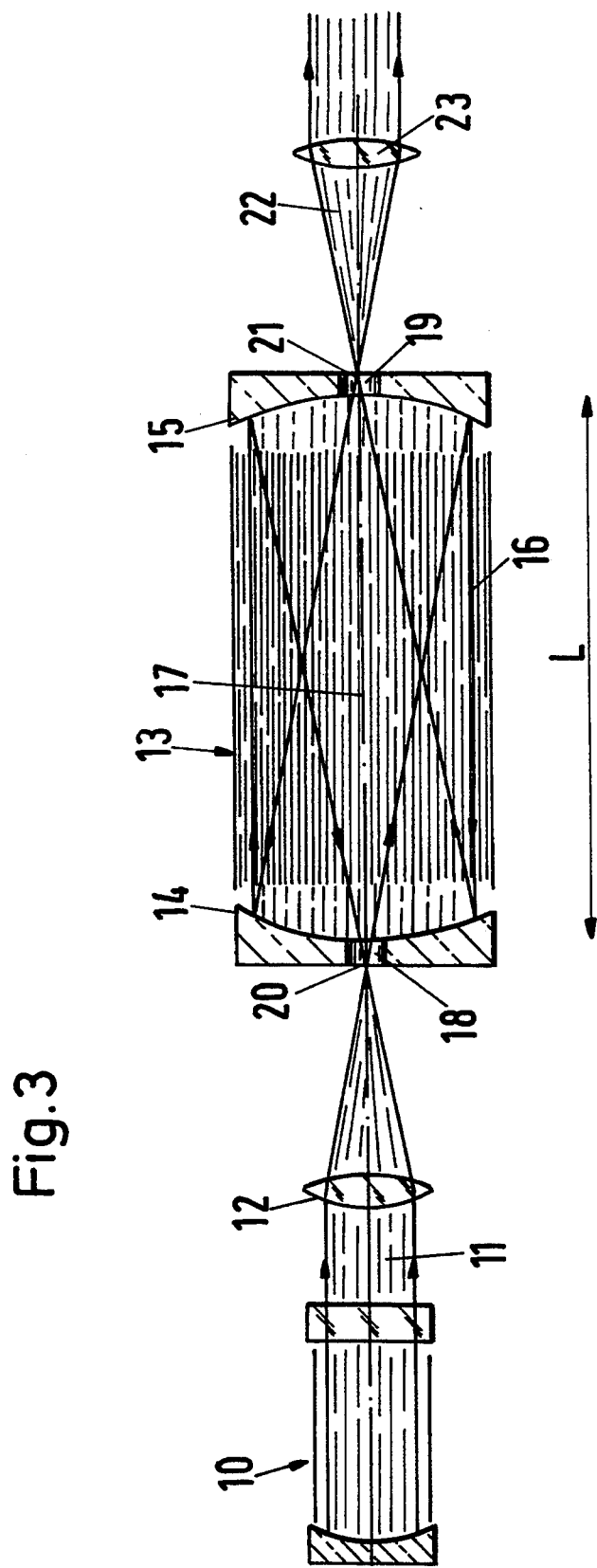
FIG. 3 shows a schematic representation of a first embodiment of laser apparatus or arrangement having features in accordance with the present invention.

The laser apparatus or arrangement according to FIG. 3 has a laser oscillator 10, which is constructed in a known manner. The laser beam 11 discharging therefrom is focussed by a focussing optical means 12. Connected behind or after the laser oscillator 10 there is a laser intensifier or amplifier 13, which on the front side is bounded by two folding mirrors or reflecting means 14 and 15. In the laser intensifier or amplifier 13 there is found the active laser medium 16, which is excited in a known manner by a non-illustrated pump mechanism. The folding mirrors or reflecting means 14 and 15 are constructed concave and in an optical axis 17 respectively having an opening 18 and 19, of which the diameter is small in comparison to the mirror or reflecting surface. The focussing optical means 12 is so constructed and arranged that the laser beam 11 discharging from the laser oscillator 10 is focussed into the opening 18 of the folding mirror or reflecting means 14. The focus 20 accordingly is found and located in this opening 18. After or behind this focus 20, the beam diameter enlarges or increases again as far as to the oppositely located folding mirror or reflecting means 15. There the laser beam is reflected to the first folding mirror or reflecting means 14, at which the laser beam is then reflected back again to the folding mirror or reflecting means 15. Via this multiple reflection at the concave folding mirror or reflecting means 14 and 15 the beam diameter in the laser intensifier 13 is reduced again. Via suitable selection of the mirror radii with that accordingly there can be attained that the beam after an uneven number N of through-passes through the intensifier or amplifier 13 with such beam then being focussed upon the second folding mirror or reflecting means 15. Advantageously this focussing occurs in such a manner that the focus 21 lies centrally within the opening 19 of the folding mirror or reflecting means 15. The focussed laser beam 22 can exit or discharge from the intensifier or amplifier 13 via this opening 19. Behind or after the intensifier or amplifier 13, the laser beam 22 then is parallelized with a suitable optical means 23 in a known manner. In the illustrated sample embodiment, the laser beam 11 passes through the laser medium 16 in the intensifier or amplifier 13 three times. The number N of the through-passes through the intensifier or amplifier 13 can be varied or changed by corresponding selection of the mirror radii, so that also a greater number of through-passes can be attained readily.

Since the laser beam 11 is focussed by the focussing optical means 12 into the opening 18 of the folding mirror or reflecting means 14, the beam diameter rises or increases very rapidly after entry into the intensifier or amplifier means 13 and varies or changes itself hardly then during several through-passes through the intensifier or amplifier. Subsequently the beam diameter decreases very rapidly in the direction toward the discharge or uncoupling opening 19. In this manner the intensifying or reinforcing laser medium 16 is well utilized with compact construction of the laser intensifier or amplifier 13.

Since the two openings 18 and 19 of the folding mirror or reflecting means 14 and 15 are located in the optical axis 17, a portion of the laser beam is removed just from the center of the beam with each reflection corresponding to the surface of these openings 18 and 19. Additionally, a laser oscillation with high intensity sets or adjusts itself to occur between the highly reflecting folding mirrors or reflecting means 14 and 15, which intensity because of the saturation of the laser medium 16 reduces the useful intensification or amplification.

Figure 4:
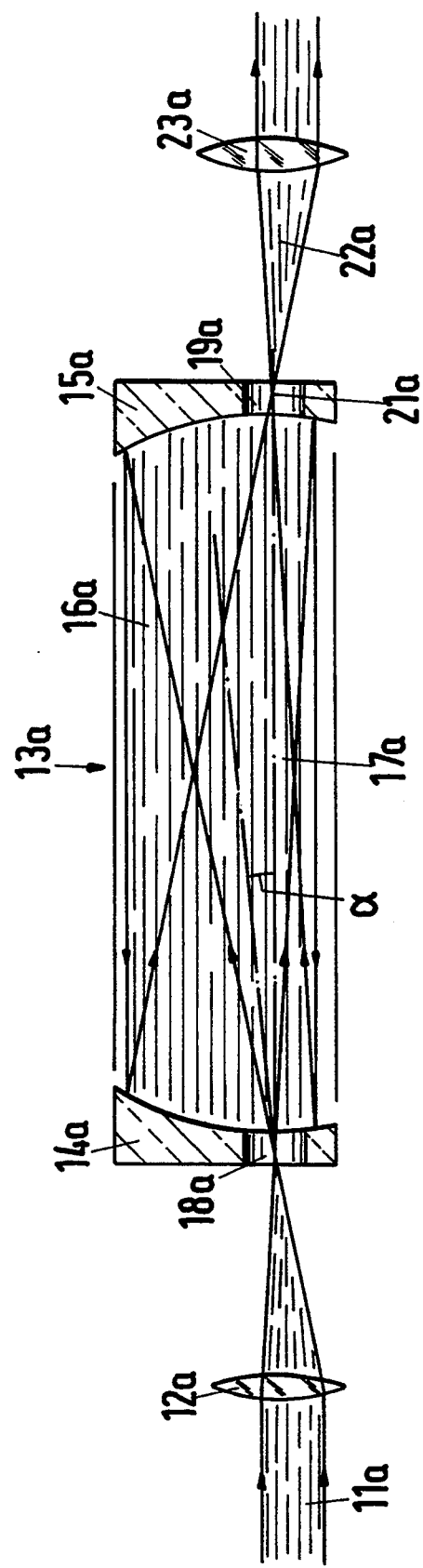
FIG. 4 shows a schematic representation of a laser intensifier or amplifier in a second embodiment having features for the laser apparatus or arrangement in accordance with the teaching of the present invention.

For this reason with the embodiment according to FIG. 4, the folding mirror or reflecting means 14a, 15a are arranged tilted or toppled over relative to the connection axis thereof. The optical axis 17a of the resonator formed by the folding mirrors or reflecting means 14a, 15a in this manner can be displaced into the vicinity of the edging of the free aperture of the intensifier or amplifier 13a, whereby reliably the vibration or pulsation as an oscillator is prevented or hindered. The useable intensification or amplification of this intensifier or amplifier 13a for this reason is very high.

The laser beam 11a emanating or coming from the non-illustrated laser oscillator is focussed in turn again with the focussing optical means 12a into the coupling-in opening 18a of the folding mirror or reflecting means 14a. The laser beam 11a is sent or beamed-in at an acute angle $\alpha$ as to the optical axis 17a into the intensifier or amplifier 13a. As with the sample embodiment according to FIG. 3 of the laser beam, after an uneven number of through-passes through the active laser medium 16a is focussed upon the second folding mirror or reflecting means 15a so that the focus 21a lies in the uncouple or coupling-out opening 19a of the folding mirror or reflecting means 15a. In the exit or discharge direction after the intensifier or amplifier 13a there is located the optical means 23a, with which the discharging or exiting, intensified, reinforced or amplified laser beam 22a is parallelized as with the previous sample embodiment. Via a suitable selection of the mirror radii, the number N of through-passes through the intensifier or amplifier 13a can be changed or varied intentionally or as aimed. The laser beam 11a entering into the intensifier or amplifier 13a initially in turn increases very rapidly in diameter and practically does not change or vary itself during several through-passes through the laser medium 16a. First not until toward the end of the through-passes does the beam diameter again decrease rapidly. With that there results again on the other hand a prominent, outstanding or excellent utilization of the intensifying laser medium 16a. The losses through the coupling-in opening 18a, respectively coupling-out opening 19a with the reflections at the folding mirrors 14a, 15a, however, are very small or nominal because these openings 18a, 19a—in contrast to the previous sample embodiment—are located in the edge region of the beam. In these beam edge regions there is noted that the intensity of the beam is generally smaller or more nominal than in the beam center, so that the losses arising here are very small or nominal.

Figure 5:
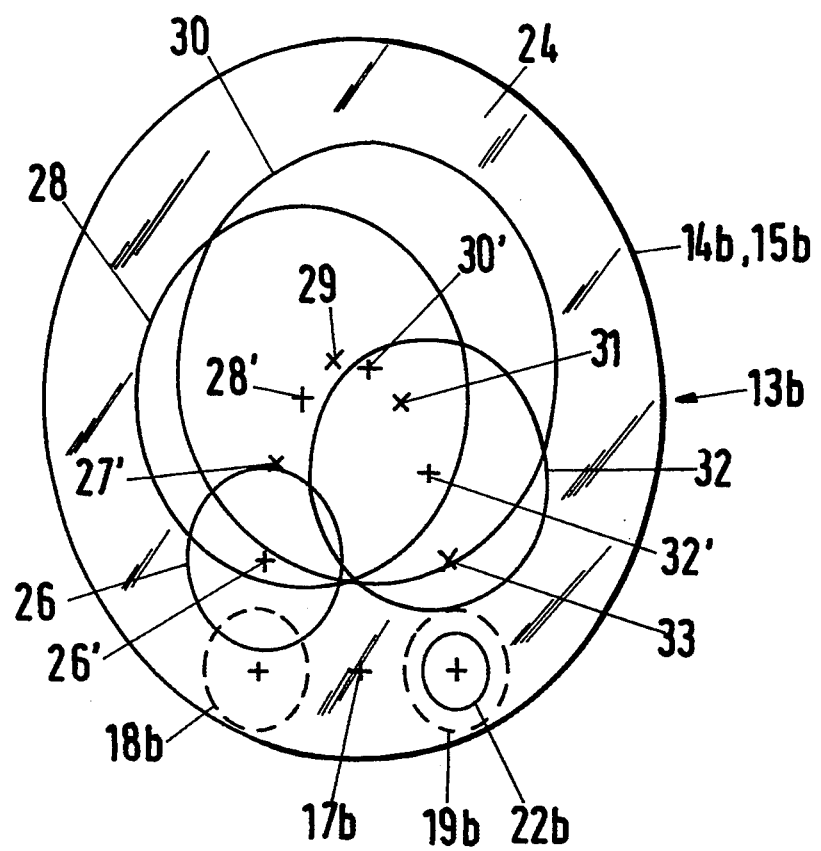
FIG. 5 is a front view of a laser intensifier or amplifier of a third embodiment of the laser apparatus or arrangement having features in accordance with the present invention.

While with the previously described sample embodiments the coupling-in and coupling-out openings 18, 19 and 18a, 19a lie in the optical axis 17, 17a of the laser intensifier or amplifier 13, 13a, these openings with the sample embodiment according to FIG. 5 are arranged displaced symmetrically as to the optical axis. The two fold mirrors 14b, 15b, of which only one folding mirror is recognizable in FIG. 5 because of the front view, are intentionally arranged tilted in turn again relative to the connection axis thereof. Consequently the optical axis 17b in turn again can be displaced so into the vicinity of the edging of the free aperture 24 of the laser intensifier or amplifier 13b, that the vibration or swinging thereof as an oscillator is reliably prevented and hindered. Symmetrically on both sides of the optical axis 17b there are located the coupling-in opening 18b and the coupling-out opening 19b. These are likewise provided near the edge of the folding mirror or reflecting means 14b, 15b. The laser beam coming from the laser oscillator is focussed in the already described manner into the coupling-in opening 18b of the folding mirror or reflecting means 14b. The oscillator beam in turn is beamed in again in an angle as to the optical axis 17b in the laser intensifier or amplifier 13b. The radii of the folding mirror or reflecting means 14b, 15b are so selected in this sample embodiment, that the entering laser beam after nine through-passes through the laser intensifier or amplifier 13b is focussed upon the second folding mirror or reflecting means 15b and can leave or depart from the intensifier or amplifier means 13b via the coupling-out opening 19b. The impinging points of the beam axis upon the folding mirror or reflecting means 14b, 15b with the nine through-passes can be found characterized or designated with crosses in FIG. 5. As a consequence of the optimized beaming-in direction of the laser beam to be intensified, strengthened or amplified, the impinging points lie upon a parabola.

The beam cross sections 26 to 30 in FIG. 5 (double 86%-radius of a Gauss beam) are represented by circles upon the rear folding mirror or reflecting means 15b. The laser beam entering via the coupling-in opening 18b to the intensifier or amplifier 13b meets or impinges upon the rear folding mirror or reflecting means 15b with a beam cross section 26 and the beam axis 26'. From there the laser beam is reflected to the front folding mirror or reflecting means 14b. The corresponding impingement point of the beam axis is designated with the reference 27'. From there the laser beam is reflected again to the rearward folding mirror or reflecting means 15b. The impingement point of the beam axis is designated with a reference 28' and the pertaining beam cross section is designated with a reference 28. The beam cross section 28 is considerably greater than the beam cross section 26 after the first through-pass. The laser beam is now reflected anew to the front folding mirror or reflecting means 14b upon which the beam axis meets or impinges in a point 29. From here the laser beam is reflected anew to the rear folding mirror or reflecting means 15b, whereby the beam axis in the meeting or impingement point 30' impinges thereon. The pertaining beam cross section is designated with the reference 30. After this fifth through-pass the laser beam has its greatest beam diameter. With the renewed reflection, the beam axis meets or impinges upon the meeting or impingement point 31 on the front folding mirror or reflection means 14b at which the laser beam is reflected anew to the rear folding mirror or reflecting means 15b. Here the beam axis in a point 32' meets or impinges upon the rear folding mirror or reflecting means 15b with the beam cross section 32. It has decreased again as a comparison to the beam cross section 30 shows and reveals. The reflected laser beam meets or impinges once again upon the front folding mirror or reflecting means 14b (impingement point 33), from which it then is so reflected in the described manner upon the rear folding mirror or reflecting means 15b, that the beam can discharge from the intensifier or amplifier 13b through the coupling-out or discharge opening 19b.

Since the coupling-in opening 18b and the coupling-out opening 19b are displaced symmetrically as to the optical axis 17b of the laser intensifier or amplifier 13b in the arrangement therewith, there is avoided that the laser beam 22b focussed discharging from the laser intensifier or amplifier and the weak oscillator beam entering through the coupling-in opening 18b into the laser intensifier or amplifier 13b intersect each other, which because of the saturation of the medium would mean a reduction of the intensification or amplification. Additionally there results a still smaller or more nominal loss in comparison to the embodiment according to FIG. 4 because the reflected beam is hardly grasped or detected by the two openings 18b, 19b.

As illustrated by FIG. 5, there results via this arrangement a region in the intensifier or amplifier 13b hardly utilized by the laser beam along the optical axis 17b of the folding mirror or reflecting means 14b, 15b. Consequently there exists the possibility to integrate the laser oscillator in the laser intensifier or amplifier.

Figure 6:
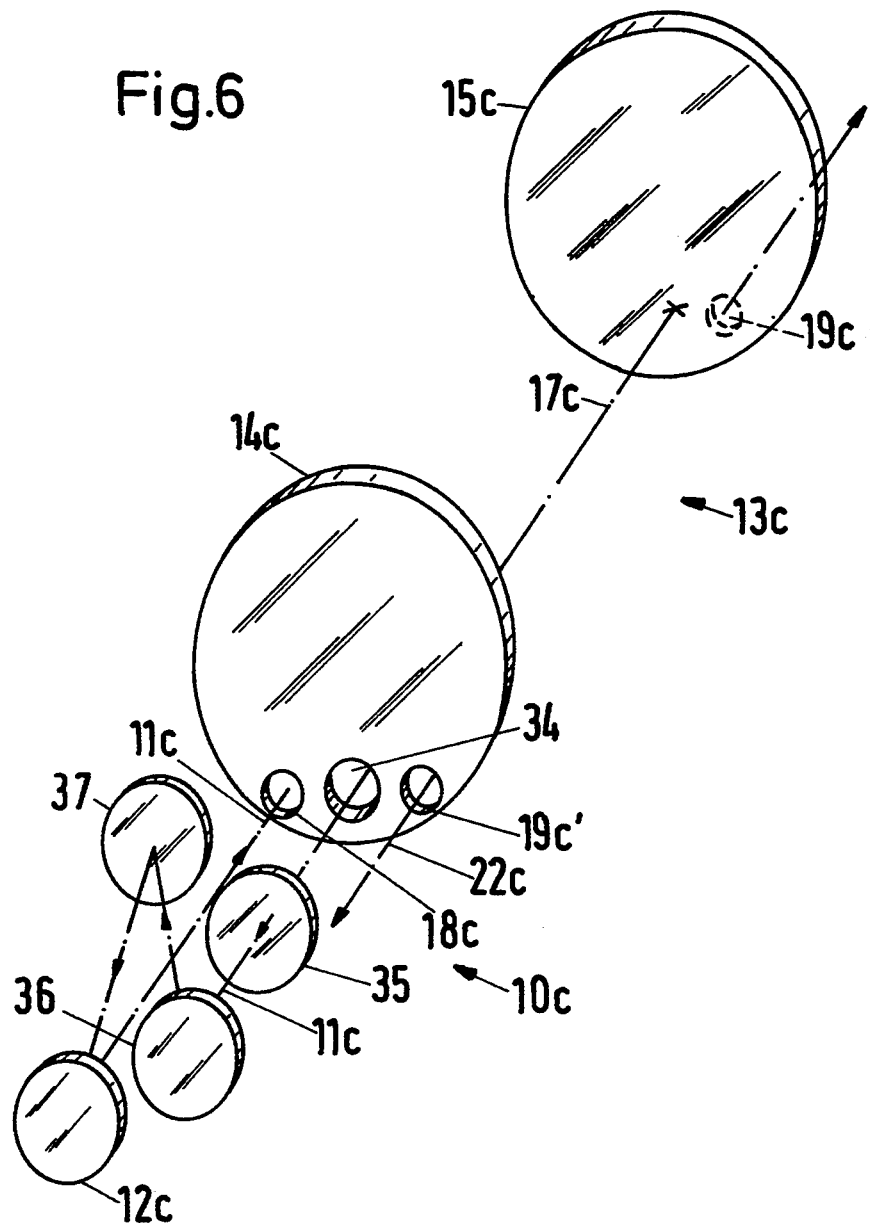
FIG. 6 is a view that shows a laser intensifier or amplifier with an integrated laser oscillator of a fourth embodiment of a laser apparatus or arrangement having features in accordance with the present invention.

Such improvement and embodiment of a laser apparatus or arrangement is shown schematically in FIG. 6. The laser intensifier or amplifier 13c has the end-side folding mirror or reflecting means 14c and 15c, which are arranged tilted intentionally or aimed with respect to the connection axis thereof. The optical axis 17c of the resonator formed by the folding mirrors or reflecting means 14c, 15c can in turn be placed in the vicinity of the edging of the free aperture of the intensifier or amplifier 13c. The front folding mirror or reflecting means 14c has the coupling-in opening 18c and the rear folding mirror or reflecting means 15c has the coupling-out opening 19c illustrated with dash or dotted lines. With the radiation or modification here to be described, the front folding mirror or reflecting means 14c in addition to the coupling-in opening 18c provides an opening 34 lying in the optical axis 17c. The coupling-in opening 18c and the coupling-out opening 19c lie corresponding to the sample embodiment according to FIG. 5 symmetrically on both sides of the optical axis 17c. The laser beam 11c entering through the coupling-in opening 18c into the laser intensifier or amplifier 13c is reflected multiply in the described manner between the folding mirror or reflecting means 14c and 15c, and during the last through-passage being so focussed upon the folding mirror or reflecting means 15c, that the laser beam can leave or depart from the intensifier or amplifier 13c through the coupling-out opening 19c. To this extent the conditions are the same as with the preceding sample embodiment. Since the region around the optical axis 17c is hardly utilized by the laser beam inside the intensifier or amplifier 13c, the laser oscillator 10c is installed and accommodated in this region with this sample embodiment. The rear folding mirror or reflecting means 15c can be installed with this described arrangement as an end mirror or reflecting means of the laser oscillator 10c. The laser beam reflected at the rear folding mirror or reflecting means 15c comes through the opening 34 in the front folding mirror or reflecting means 14c upon a partially transmitting coupling-out plate 35. This partially transmitting mirror or reflecting means together with a part or portion of the rearward folding mirror or reflecting means 15c forms the optical laser oscillator 10c. The laser beam 11c coming through the partially transmitting mirror or reflecting means 35 is diverted or deflected via two deviating mirror or reflecting means 36 and 37 to the focussing optical means 12c, which in the sample embodiment is embodied or constructed as a focussing mirror and focussing the laser beam in the manner already described above into the coupling-in opening 18c of the folding mirror or reflecting means 14c. If required there can be installed or introduced a quicker power capacity modulator known itself between the laser oscillator 10c and the laser intensifier or amplifier 13c.

With another non-illustrated embodiment in the rear folding mirror or reflecting means 15c upon the optical axis 17c there can be provided an opening behind which there can be arranged a separate end mirror, an optical grill, lattice or grating, a polarizer or polarization means, an optical modulator for quality switching of the oscillator and the like.

FIG. 6 shows with the full lines a further embodiment of a laser apparatus or arrangement. In this situation the coupling-out opening 19c' is located in the front folding mirror or reflecting means 14c. The coupling-in opening 18c and this coupling-out opening 19c' in turn again lie symmetrical to the optical axis 17c of the two folding mirror or reflecting means 14c, 15c. The coupling-out opening 19c' is so placed and located that the laser beam 22c discharging or exiting therefrom is not hindered by the laser oscillator 10c. Moreover this embodiment corresponds to the previously described embodiment. Since the coupling-in opening 18c and the coupling-out opening 19c' are provided in the front folding mirror or reflecting means 14c, the construction length of the laser intensifier or amplifier 13c can be reduced, because the parallelization optical means, which is not shown or illustrated in FIG. 6 for reasons of facilitating viewing and consideration thereof, not being located after or behind the folding mirror or reflecting means 15c, but rather being arranged upon the same side as the focussing optical means 12c required anyhow.

Also with the embodiment according to FIG. 5, the coupling-in opening and the coupling-out opening 18b and 19b respectively can be provided on the same or identical folding mirror or reflecting means.

Via aspheric mirror surfaces of the folding mirrors or reflecting means and a suitable selection of the beaming-in direction into the laser intensifier or amplifier, with the described embodiments, the beam course or path in the intensifier or amplifier also on the intensifier or amplifier tube can be matched or adapted with non-circular but rather for example elliptical or rectangular cross section.

The transfer or transmission characterization line of the laser intensifier or amplifier generally is not linear, because with increasing entry power-capacity via such saturization effects the intensification or amplification decreases. FIG. 7 now shows an embodiment of a laser intensifier or amplifier with which the transfer or transmission characterizing line is linear over a wide range of the input power capacity. In order to attain this characteristic, the folding mirror or reflecting means in the above described embodiments can be provided with one or two further bores. This is to be discussed and described in greater detail on the basis of FIG. 7. FIG. 7 shows the two folding mirror or reflecting means 14d and 15d in a position turned by 90° compared with that shown in FIG. 4, so that the additional openings 38 and 39 are recognizable in the folding mirror or reflecting means 15d. The laser beam 11d to be intensified or amplified passes or enters through the coupling-in opening 18d of the folding mirror or reflecting means 14d and leaves or departs from the intensifier or amplifier 13d in the sample embodiment after four through-passes through the coupling-out opening 19d in the folding mirror or reflecting means 18d. The folding mirror or reflecting means 15d focusses the laser beam again in turn in the coupling-out opening 19d. The coupling-in opening 18d and the coupling-out opening 19d again in turn lie symmetrically on both sides of the optical axis 17d of the two folding mirror or reflecting means 14d, 15d.

With adequate or sufficient spacing behind the opening 38 of the folding mirror or reflecting means 15d there is provided an end mirror or reflecting means 40, while with sufficient or adequate spacing behind the opening 39 there is arranged a partially transmitting mirror 41. The bending radius of the mirror surfaces of these two mirrors 40 and 41 is so selected that a laser oscillator results, of which the mode volume extensively grasps or detects the intensifying or amplifying laser medium in the intensifier or amplifier 13d. The portion of the beam transversely passing through the partially permeable mirror 41 is absorbed in a so-called beam sump 42, which for example can be a blackened or darkened aluminum-plate or copper plate. This oscillator via the beam capacity or performance thereof and the resulting saturation of the laser medium in the intensifier or amplifier 13d sets or adjusts the particular or pertaining (constant) intensification or amplification, which compensates the losses through the partially transmitting mirror 41. Since this auxiliary oscillator and the actual intensifier or amplifier 13d use or employ the same intensifying laser medium, also the intensification or amplification thereof is constant. In FIG. 7 there is characterized the optical axis of this auxiliary resonator respectively auxiliary oscillator with a reference numeral designation 43.

The folding mirror or reflecting means 15d also can provide only one opening 38 or 39, behind which a partially permeable mirror is arranged with a subsequently connected or arranged beam absorber. In this situation the opening 38 respectively 39 lies in the optical axis 17d.

The intensification or-amplification is adjustable or variable via the transmission of the partially permeable mirror 41. Upon exceeding of a predetermined input power capacity there is closed or shut-off the oscillation of the auxiliary oscillator (auxiliary resonator). In FIG. 8 there is illustrated the transmission characterizing line of the intensifier or amplifier 13d. Here the input power capacity $P_{in}$ are entered against the output capacity $P_{out}$. The characterizing line of the intensifier or amplifier without the auxiliary oscillator is represented with the full line.

Clearly recognizable is that with increasing input power capacity $P_{in}$ that the intensification or amplification decreases and the output power capacity $P_{out}$ does not increase linearly with the input power capacity. By means of the auxiliary oscillator there can now be made linear the characterizing line over a large range of the input power capacity. This is set forth and represented in FIG. 8 with the dash lines and the dot-dash characterizing line. The characterizing line path or course corresponding to the dash line results with low transmission losses of the auxiliary oscillator and the path or course characterized with the dot-dash line results with high transmission losses of the auxiliary oscillator. As the characterizing lines in FIG. 8 show, the oscillation of the auxiliary oscillator closes or shuts down upon exceeding of a predetermined input power capacity $P_{in}$, and the output power capacity $P_{out}$ of the intensifier or amplifier 13d then follows the characterizing line of the intensifier or amplifier without the auxiliary oscillator (full line). Optimum conditions exist when the characterizing line of the intensifier or amplifier 13d proceeds linearly over the useable range of the available laser oscillator. Then there is closed or shut off the oscillation of the auxiliary oscillator upon reaching or attaining the maximum available input power capacity.

If the intensifier or amplifier 13d in the folding mirror or reflecting means 14d does not provide the openings 18d and 19d, then this intensifier or amplifier operates or is effective as a laser oscillator with a good quality beam intensity. If in the folding mirror or reflecting means 15d only one opening 38 or 39 is provided, then after or behind this opening externally of the intensifier or amplifier there is provided or located the partially permeable mirror 41 without beam absorber 42. If the folding mirror or reflecting means 15d has the two openings 38 and 39, then there is eliminated only the beam absorber. Finally there is also an embodiment possible with which the two openings 38 and 39 are provided upon the two folding mirror or reflecting means 14d and 15d. The corresponding partially permeable respectively reflecting mirror means in these situations are so to be arranged that the mirror surfaces lie vertically or at right angles to the beam direction in the intensifier or amplifier.

With all embodiments with rising or increasing number N of through-passes of the laser beam through the laser medium of the intensifier or amplifier there increases the utilization or exploitation of the intensifying or amplifying medium, simultaneously, however, also the sensitivity of the system with respect to a dejusting of the folding mirror and a thermal lens effect of the laser medium. If N is prescribed as a result of an optimizing estimation, accordingly the bending radii of the folding mirror is calculable from this value and the length L of the intensifier or amplifier. For a geometry there are possible different combinations of the two bending radii; accordingly one of the two folding mirror or reflecting means always can be embodied or constructed as a plane mirror. If a folding mirror or reflecting means is constructed or embodied as a convex mirror, the other being embodied or constructed as a concave mirror, accordingly an intensifying or amplifying laser medium can be utilized with variable cross section along the optical axis. This is advantageous for example in axial flow $CO_2$ laser intensifiers or amplifiers of high power capacity, since via a cross section of the discharging tube increasing in flow direction, the pressure decrease or drop required by the heat expansion of the laser gas in tubes of constant cross section is avoided.

The focus diameter in the coupling-in opening determines with the described embodiments the beam diameter upon the folding mirror or reflecting means. The focus diameter is so selected that the bending losses at the free aperture of the intensification or amplification tube do not become too great, on the other hand a good volume utilization or exploitation being given. FIG. 5 shows the result of a corresponding optimizing calculation. The diameter of the coupling-in openings respectively coupling-out openings should amount to at least approximately one and one half times the particular respective focussed diameter in order to keep the fading, screening or shading off losses small or nominal and not to worsen the beam quality via bending effects.

In $CO_2$-lasers respectively $CO_2$ laser intensifiers or amplifiers with high output power capacity, the working or operating gas is pumped with high speed or velocity through the discharge chamber or space. The costs or expenditure of the pumps necessary for this purpose decrease or are reduced when the discharge chamber or space is constructed flow-advantageous out of relatively short tubular means with a large free cross section. With such an embodiment the production or generation of a laser beam with high beam quality (ground or base mode) and high output power capacity with conventional or prior laser oscillators is not possible, while the known single-pass-intensifiers operate with small or nominal efficiency. With the described inventive laser apparatus or arrangements, it is possible in contrast to realize and obtain the intensifier or amplifier with high efficiency in such a compact embodiment or construction whereby simultaneously many disadvantages of the conventional or prior intensifiers or amplifiers are avoided. If the laser oscillator, as set forth and described on the basis of FIG. 6, is integrated in the intensifier or amplifier, so accordingly the costs or expenditure and expenses for this ground or base mode radiation source would not be considerably higher than those for the conventional or prior laser oscillator with the same or identical output power capacity, although clearly smaller or more nominal beam quality. Additionally there is a nearly desired suitable rapid modulation of the output power capacity made possible via a modulator between the laser oscillator and the laser intensifier or amplifier. As required in this situation the characterizing line of the laser intensifier or amplifier can be linearized with small or nominal cost expenditure and complexity.

The described embodiments with all laser types are employable with only small or nominal intensification or amplification per length unit, when the intensification or amplification can be attained over a relatively large cross section.

With the described embodiments, the length of the intensifier or amplifier can be reduced or decreased in a known manner for example via V-shaped folding or reflection.

In summary, the present invention pertains to a laser apparatus or arrangement with a laser oscillator and a subsequently connected or arranged laser intensifier or amplifier, which has an entry region for the laser beam to be intensified or amplified coming from the laser oscillator and a discharge or outlet for the intensified or amplified laser beam and which is provided with a folding mirror or reflecting means which is located lying opposite the inlet or entry region for the laser beam to be intensified or amplified. The inlet or entry region for the laser beam 11, 11a through 11d to be intensified or amplified is an opening 18, 18a through 18d in a further folding mirror or reflecting means 14, 14a through 14d; 15, 15a through 15d, that is located or lies opposite to the other folding mirror or reflecting means, that the outlet or discharge for the intensified or amplified laser beam 22, 22a, 22b likewise is an opening 19, 19a through 19c, 19c', 19d in one of the two folding mirror or reflecting means, that the opening width of the inlet opening and the outlet or discharge opening is small in relation to the mirror surface of the particular respective folding mirror or reflecting means, and that the cross section of the laser beam inside or within the laser intensifier or amplifier 13a through 13d is at least partially greater by a multiple than in a region of the inlet opening and outlet opening.

The foregoing laser apparatus or arrangement is further characterized thereby that for the inlet or entry of the laser beam to be intensified or amplified and for the discharge or outlet of the intensified or amplified laser beam respectively at a time there is provided an opening in at least one of the two folding mirror or reflecting means.

Also in the foregoing laser apparatus or arrangement, a common opening is provided in one of the two folding mirror or reflecting means.

In the foregoing laser apparatus or arrangement, the laser beam 11, 11a, 11c, 11d to be intensified or amplified is focussed into the inlet or entry opening 18, 18a through 18d.

The laser apparatus or arrangement according to the foregoing is further characterized thereby that the folding mirror or reflecting means 14, 14a through 14c, 15c, 15d located opposite or across from the discharge opening 19, 19a through 19c, 19c', 19d focusses the intensified or amplified laser beam 22, 22a, 22b after the last reflection in the intensifier or amplifier means into the discharge or outlet opening 19, 19a through 19c, 19c', 19d.

The foregoing laser apparatus or arrangement has the entry or inlet opening 18, 18a through 18d and the outlet or discharge opening 19, 19a through 19c, 19c', 19d provided at different folding mirror or reflecting means 14, 14a through 14d; 15, 15a through 15d.

The laser apparatus or arrangement according to the foregoing is further characterized thereby that the folding mirror or reflecting means 14a through 14d, 15a through 15d are arranged tilted relative to the connection axis thereof, whereby preferably the optical axis 17a through 17d lies in the vicinity or close to the edging of the free aperture of the laser intensifier or amplifier 13a through 13d.

Further in accordance with the foregoing, the laser beam 11, 11a, 11c, 11d to be intensified or amplified enters into the laser intensifier or amplifier 13, 13a through 13d under an angle α relative to the optical axis 17, 17a through 17d.

The laser arrangement or apparatus according to the foregoing is characterized further therein that the inlet or entry opening 18b, 18c, 18d and the outlet or discharge opening 19b, 19c, 19d as seen in the direction of the optical axis 17b through 17d, lie on both sides of, preferably symmetrically, of the optical axis.

The laser arrangement or apparatus according to the foregoing is further characterized therein that in a region or range externally or outside of the laser intensifier or amplifier 13d before respectively behind the respective opening 38, 39 there is arranged a partially permeable respectively reflecting mirror so that the laser intensifier or amplifier operates as a laser oscillator.

A laser oscillator 10c is integrated in the laser intensifier or amplifier 13c.

The laser apparatus or arrangement also is characterized therein that one of the folding mirror or reflecting means, preferably the folding mirror or reflecting means 14c of the laser intensifier or amplifier 11c providing or having the inlet or entry opening 18c has a further opening 34, behind or after which a partially permeable mirror 34 of the laser oscillator 10c is arranged, of which the end mirror preferably is the other folding mirror or reflecting means 15c of the laser intensifier or amplifier 13c.

The foregoing laser apparatus or arrangement is also characterized therein that the partially permeable mirror or reflecting means 34 of the laser oscillator 10c for the laser beam 11c to be intensified or amplified has a deflecting or deviating device or unit 36, 37 connected thereafter, which preferably is connected after a focussing device which focusses the laser beam 11c to be intensified or amplified into the entry or inlet opening 18c of the one folding mirror or reflecting means 14c of the laser intensifier or amplifier 13c.

The foregoing laser apparatus or arrangement is further characterized thereby that an auxiliary laser oscillator is arranged or associated with the laser intensifier or amplifier 13d.

In the foregoing, the entry or inlet opening 18d and the discharge or outlet opening 19d are arranged in a folding mirror or reflecting means 14d of the laser intensifier or amplifier 13d.

Also in the foregoing, the other folding mirror or reflecting means 15d provides at least one opening 38, 39 behind or after which a partially permeable mirror 41 of the auxiliary laser oscillator is arranged.

The foregoing also is characterized therein that the other folding mirror or reflecting means 15d provides two openings 38, 39 and that behind or after the one opening 38 in a region externally of the laser intensifier or amplifier 13d there is arranged an end mirror 41 and behind the other opening 39 in a region externally of the laser intensifier or amplifier there is arranged a partially permeable mirror 41 of the auxiliary laser oscillator.

Furthermore, as to the end mirror 40 of the auxiliary laser oscillator there is arranged or associated therewith as a counter reflector one of the two folding mirror or reflecting means 14d, 15d of the laser intensifier or amplifier 13d, which preferably together with the auxiliary laser oscillator utilizes and employs the same intensifying or amplifying laser medium.

After or behind the partially permeable mirror 41 of the auxiliary laser oscillator there is arranged a beam absorber 42.

One folding mirror or reflecting means 14d is constructed closed. One of the two folding mirror or reflecting means 14, 14a through 14d; 15, 15a through 15d is embodied or constructed as a plane mirror.

The two folding mirror or reflecting means 14, 14a through 14d; 15, 15a through 15d are embodied and constructed as concave mirror means.

Also further in accordance with the laser apparatus and arrangement of the present invention there is noted that one folding mirror or reflecting means 14, 14a through 14d respectively 15, 15a through 15d is embodied and constructed as a convex mirror and the other folding mirror or reflecting means 15, 15a through 15d respectively 14, 14a through 14d is embodied or constructed as a concave mirror.

The width of the inlet or entry opening 18, 18a through 18d amounts to or corresponds to at least approximately one and one half times the diameter of the focus 20 of the laser beam 11, 11a, 11c, 11d to be intensified or amplified in the inlet or entry opening 18, 18a through 18d of the corresponding or pertaining folding mirror or reflecting means 14, 14a through 14d.

Also in accordance with the present invention the width of the outlet or discharge opening 19, 19a through 19c, 19c', 19d amounts to or corresponds to at least approximately one and one half times the diameter of the focus 21, 21a of the intensified or reinforced laser beam 22, 22a, 22b in the outlet or discharge opening 19, 19a through 19c, 19c', 19d of the corresponding or pertaining folding mirror or reflecting means.

Finally, also in accordance with the laser apparatus and arrangement of the present invention, a power capacity modulator means is arranged between the laser oscillator 10, 10c and the laser intensifier or amplifier 13, 13a through 13d.

The present invention is, of course, in no way restricted to the specific disclosure of the specification and drawings, but also encompasses any modifications within the scope of the appended claims.

What I claim is:

1. A laser apparatus including a laser oscillator and a laser intensifier, including an inlet region in said laser intensifier for a laser beam coming from the laser oscillator and an outlet region in said laser intensifier for the intensified laser beam and said laser intensifier containing a laser medium is provided with a folding mirror which lies opposite to said inlet region for the laser beam, comprising improvement in combination therewith:

said inlet region for the laser beam is an inlet opening means in a further folding mirror which lies opposite to the other folding mirror, said outlet region for the intensified laser beam is an outlet opening means in one of the two folding mirrors tiltable as to each other; that the opening width of said inlet opening means and said outlet opening means is small in relation to the mirror surface of the respective folding mirror; and a cross section of the laser beam within the laser intensifier being at least partially multiply greater than that in the region of the inlet opening means and outlet opening means;

the folding mirror located opposite said outlet opening focusses the intensified laser beam after the last reflection in the laser intensifier into said outlet opening means;

an optical axis of said two folding mirrors is arranged near an edge of a free aperture of said laser intensifier so that said laser intensifier is precluded from operation as an oscillator; and the laser beam enters into the laser intensifier as focussed through an opening in one folding mirror under an angle relative to said optical axis between said folding mirrors tiltable as to each other.

2. A laser apparatus in combination according to claim 1, in which for the inlet of the laser beam to be intensified and for the outlet of the intensified laser beam respectively one opening means is provided in at least one of the two folding mirrors.

3. A laser apparatus in combination according to claim 1, in which a common opening is provided in one of the two folding mirrors.

4. A laser apparatus in combination according to claim 1, including means to focus the laser beam to be intensified in the inlet opening.

5. A laser apparatus in combination according to claim 1, in which the inlet opening and the outlet opening are provided at different folding mirrors.

6. A laser apparatus in combination according to claim 1, in which the optical axis lies in close vicinity relative to the edging of the free aperture of the laser intensifier.

7. A laser apparatus in combination according to claim 1, in which the inlet opening and the outlet opening, seen in the direction of the optical axis between the folding mirrors, lie on both sides respectively symmetrically of the optical axis.

8. A laser apparatus in combination according to claim 1, in which a partially permeable respectively reflecting mirror is provided structurally in a region externally of the laser intensifier in conjunction with the pertaining opening.

9. A laser apparatus in combination according to claim 8, in which the laser oscillator is provided structurally integrated in the laser intensifier.

10. A laser apparatus in combination according to claim 9, in which one of the folding mirrors, particularly the folding mirror of the laser intensifier providing the inlet opening has a further opening behind which a partially permeable mirror of the laser oscillator is provided structurally arranged of which the end mirror particularly is the other folding mirror of the laser intensifier.

11. A laser apparatus in combination according to claim 10, in which the partially permeable mirror of the laser oscillator for the laser beam has a deviating unit connected there behind which particularly has a focussing unit connected thereafter which focusses the laser beam into the inlet opening of one folding mirror of the laser intensifier.

12. A laser apparatus in combination according to claim 8, in which a power capacity modulator is arranged between the laser oscillator and the laser intensifier.

13. A laser apparatus in combination according to claim 1, in which one folding mirror is constructed closed without any interrupting opening therein.

14. A laser apparatus in combination according to claim 1, in which one of two folding mirrors is constructed as a plane mirror.

15. A laser apparatus in combination according to claim 1, in which both folding mirrors are constructed as concave mirrors.

16. A laser apparatus in combination according to claim 1, in which one folding mirror is constructed as a convex mirror and the other folding mirror is constructed as a concave mirror.

17. A laser apparatus in combination according to claim 1, in which the width of the inlet opening means amounts to at least approximately one and one half times the diameter of the focus means of the laser beam to be intensified in the inlet opening of the corresponding folding mirror.

18. A laser apparatus in combination according to claim 1, in which the width of the outlet opening means amounts to at least approximately one and one half times the diameter of the focus means of the intensified laser beam in the outlet opening of the corresponding folding mirror.

19. A laser apparatus including a laser oscillator and a laser intensifier, including an inlet region in said laser intensifier for a laser beam coming from the laser oscillator and an outlet region for the intensified laser beam and said laser intensifier containing a laser medium is provided with a folding mirror which lies opposite to said inlet region for the laser beam, comprising improvement in combination therewith:

said inlet region for the laser beam is an inlet opening means in a further folding mirror which lies opposite to the other folding mirror, said outlet region for the intensified laser beam is an outlet opening means in one of the two folding mirrors tiltable as to each other; that the opening width of said inlet opening means and said outlet opening means is small in relation to the mirror surface of the respective folding mirror;

a cross section of the laser beam within the laser intensifier being at least partially multiply greater than that in the region of the inlet opening means and the outlet opening means; and an auxiliary laser oscillator structurally also provided with the laser intensifier.

20. A laser apparatus in combination according to claim 19, in which the inlet opening and the outlet opening are provided structurally located in one folding mirror of the laser intensifier.

21. A laser apparatus in combination according to claim 20, in which the other folding mirror has at least one opening behind which a partially permeable mirror of the auxiliary laser oscillator is arranged.

22. A laser apparatus in combination according to claim 21, in which the other folding mirror has two openings and that behind the one opening in a region externally of the laser intensifier there is an end mirror and behind the other opening in a region externally of the laser intensifier there is arranged a partially permeable mirror of the auxiliary laser oscillator.

23. A laser apparatus in combination according to claim 22, including with respect to the end mirror of the auxiliary laser oscillator as a resonator relative thereto one of the two folding mirrors of the laser intensifier being provided structurally located therewith which preferably employs and utilizes the same intensifying laser medium together with the auxiliary laser oscillator.

24. A laser apparatus in combination according to claim 23, in which a beam absorber means is arranged behind the partially permeable mirror of the auxiliary laser oscillator.

25. A laser apparatus in combination according to claim 19, in which said auxiliary laser oscillator is integrated in said laser intensifier having the two folding mirrors to utilize the same intensifying laser medium, one of said folding mirrors being provided with an opening through which the laser beam passes and impinges upon a partially permeable mirror-reflecting means which together with a part of the rearward folding mirror forms said auxiliary laser oscillator and via a deviating mirror means and focussing optic means the laser beam is focussed into the inlet opening of said one of said folding mirrors.

* * * * *